UNITED STATES PATENT OFFICE.

JOSÉ PINETTA, OF GUATEMALA, GUATEMALA, ASSIGNOR TO HERMAN GROTE, OF SAME PLACE.

PROCESS OF REMOVING FUSEL-OIL FROM CRUDE SPIRITS.

SPECIFICATION forming part of Letters Patent No. 384,868, dated June 19, 1888.

Application filed April 20, 1887. Serial No. 235,434. (No specimens.) Patented in France October 18, 1886, No. 179,079; in Belgium October 19, 1886, No. 74,898; in Sweden October 20, 1886, No. 1,088; in Norway October 21, 1886, No. 277; in Spain November 27, 1886, No. 10,135; in Italy December 31, 1886, XX, 20,656, XLI, 153; in Germany January 22, 1887, No. 41,678; in England February 10, 1887, No. 2,109; in Portugal August 4, 1887, No. 1,156, and in Barbadoes August 12, 1887, No. 31.

*To all whom it may concern:*

Be it known that I, JOSÉ PINETTA, of Guatemala, in the Republic of Guatemala, Central America, have invented certain new and useful Improvements in the Process of Removing Fusel-Oils from Crude Spirits and from a Mash containing Crude Spirits, (which have heretofore been patented to me by the Governments of France October 18, 1886, No. 179,079; Belgium October 19, 1886, No. 74,898; Sweden October 20, 1886, No. 1,088; Norway October 21, 1886, No. 277; Spain November 27, 1886, No. 10,135; Italy December 31, 1886, XX, 20,656, XLI, 153; Germany January 22, 1887, No. 41,678; England February 10, 1887, No. 2,109; Portugal August 4, 1887, No. 1,156, and Barbadoes August 12, 1887, No. 31,) of which the following is a specification.

This invention relates to an improved process of removing fusel-oil and other impurities from crude spirits, or from a mash containing crude spirits; and the invention consists in the treatment of the crude spirits, or a mash containing the same, with a chemical product composed of a mixture of nitrate of an alkali with a nitrite of an alkali, as will appear more fully hereinafter, and finally be pointed out in the claim.

In carrying out my invention saltpeter (nitrate of potash or soda) is mixed with carbonate of magnesia, or with caustic and other alkalies, lime or other alkaline earths, preferably in the proportions of one part of saltpeter with two parts of carbonate of magnesia or alkali, or alkaline earth, magnesia, and some undecomposed carbonate of magnesia. This mixture is heated to red heat and kept at this temperature for about two hours. The calcining operation is carried on in iron retorts or vessels, and suitable stirring. After the mass is cooled the same is screened and the solid parts are pulverized. The thus-obtained mass or chemical product contains by analysis a mixture of nitrate of potash (or soda) and nitrite of potash (or soda) as the active purifying agents, and if carbonate of magnesia is used this product is mixed with charcoal or other substance used for purifying crude spirits. The pulverized product is mixed with the crude spirits and allowed to stand for some hours before the same is transferred to the still for distillation.

In some cases the purifying product can be charged directly to the spirits in the still, which are then distilled off. The quantity of the purifying mass or product has to be in proportion to the quality of the spirits to be distilled. The most advantageous proportion, however, is from forty-five to sixty grams for every hundred liters of spirits. The purifying mass or product has the effect that during the distillation of the crude spirits the fusel-oils are held back by absorption, so that the yield of the spirit, as compared to other methods, is considerably greater, especially as during the first and last part of the distilling operation the percentage of fusil-oil is much smaller, owing to their retention by the purifying mass. When the distillation of the spirits has taken place, the fusel-oil is finally separately distilled, its separation having been delayed up to this time by the presence of the purifying mass. The crude spirits are not required to be diluted for the distillation. The spirits obtained during the first and last stages of the distilling process are also mixed with the purifying mass in the same manner and proportions as before described, so that on distilling these spirits the fusel-oil is retained in the still, while pure spirits are distilled off. The purifying compound may also be added directly to the mash and allowed to remain as long as possible in contact therewith. It is thoroughly mixed with the mash in the mash-tub. The quantity of purifying compound to be added varies according to the mash to be treated, but has to be about in the proportion hereinbefore set forth, which is determined by the quantity of spirits contained in the mash. The alcoholic vapors arising in the distilling process can also be conducted through a body of said purifying mass, and thereby effectually freed from fusel-oil.

The invention has been found applicable to all kinds of crude spirits, whether produced from cane or beet-root molasses, or from a mash of maize, potatoes, or other raw material used for the manufacture of spirits.

Having thus described my invention, I claim as new and desire to secure by Letters Patent—

The process herein described of removing fusel-oil and other impurities from crude spirits, or from a mash containing the same, which consists, first, in mixing the crude spirits, or a mash containing the same, with a pulverized purifying compound composed essentially of a mixture of a nitrate and a nitrite of an alkali, and then distilling said spirits or mash, substantially as set forth.

In testimony that I claim the foregoing as my invention I have signed my name in presence of two subscribing witnesses.

JOSÉ PINETTA.

Witnesses:
GUILLERINO KUHSIEK,
ERNESTO BIRCHE.